J. G. VINCENT.
HYDROCARBON MOTOR.
APPLICATION FILED MAY 10, 1919.

1,345,903.

Patented July 6, 1920.
2 SHEETS—SHEET 1.

Inventor,
Jesse G. Vincent,
By Milton Tibbetts
Atty.

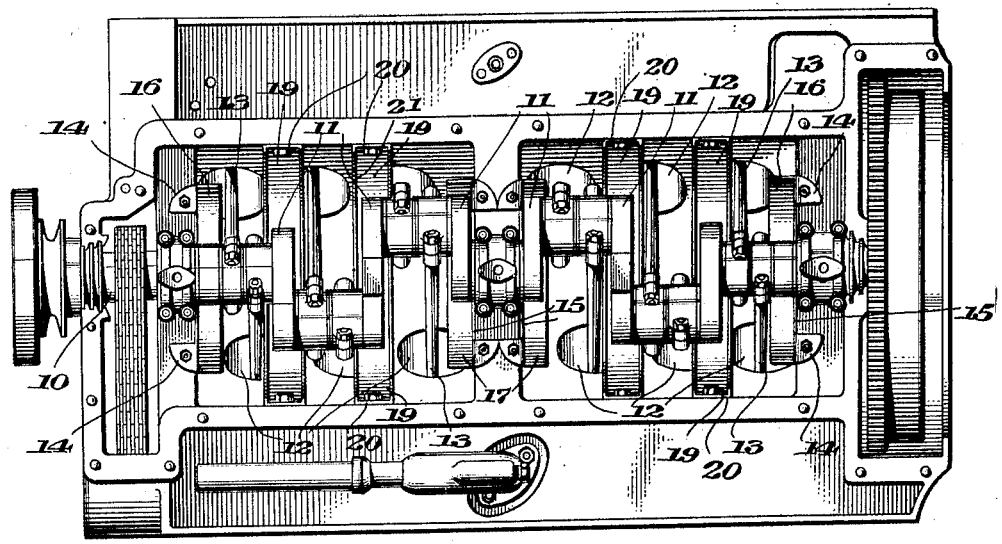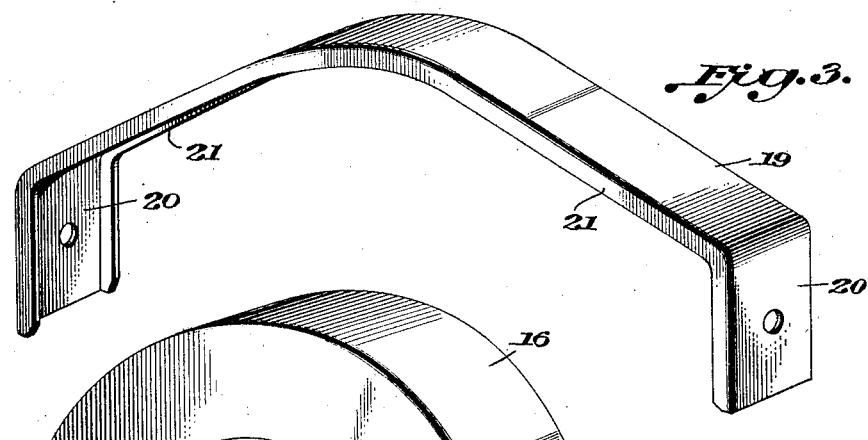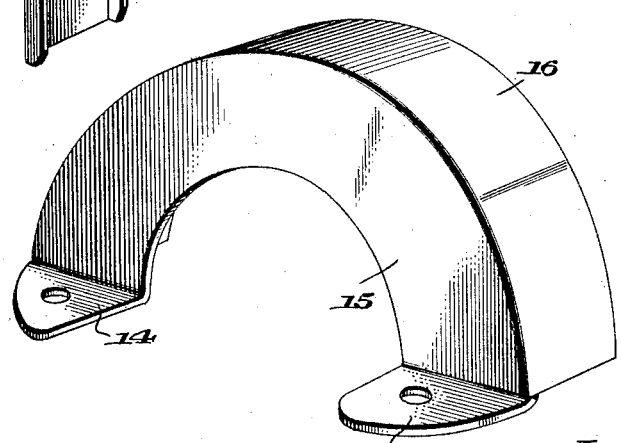

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON-MOTOR.

1,345,903.

Specification of Letters Patent.

Patented July 6, 1920.

Application filed May 10, 1919. Serial No. 296,275.

*To all whom it may concern:*

Be it known that I, JESSE G. VINCENT, a citizen of the United States, and resident of Detroit, Wayne county, State of Michigan, have invented certain new and useful Improvements in Hydrocarbon-Motors, of which the following is a specification.

This invention relates to hydrocarbon motors and particularly to lubricant baffling means.

The principal object of the invention is to provide baffle means coöperating with the crank shaft, crank case and cylinders to prevent lubricant from being thrown by the crank cheeks into the cylinders while at the same time the usual amount of ventilating space around the baffle means and lower end of the cylinder is maintained whereby any restriction of the cylinder opening, that would tend to establish an increased suction in the cylinder behind the piston, is avoided.

With this object and others in view, the invention is embodied in preferable form in the construction and arrangement hereinafter described and illustrated in the accompanying drawings, in which:

Fig. 2 is a plan view looking up at the bottom of the upper half of the crank case;

Fig. 3 is a perspective edge view of one of the baffle plates used in the construction; and Fig. 4 is a similar view of another baffle plate employed therein.

Figure 1:
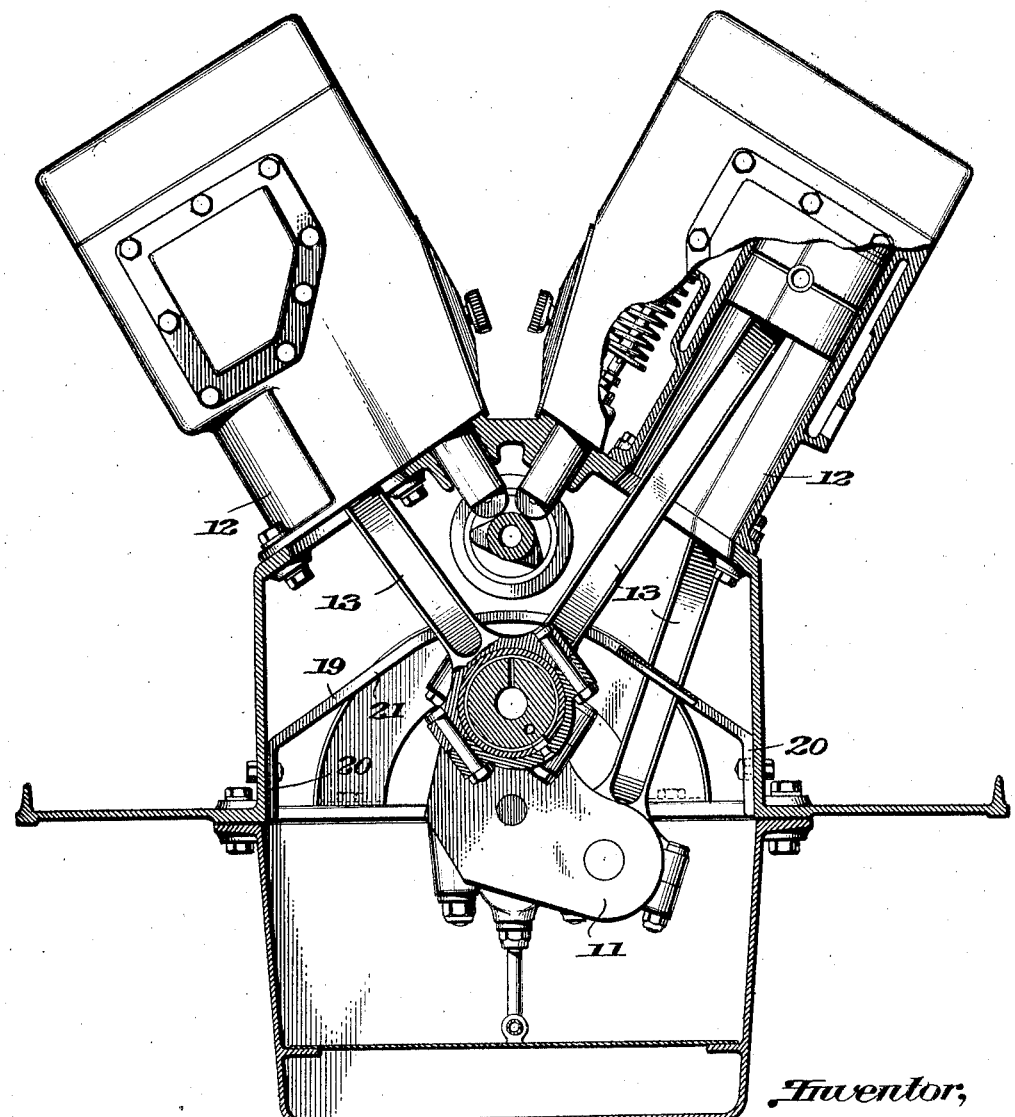
Figure 1 is an end view partly in vertical cross section of a motor.

Referring to the drawings, 10 indicates the crank shaft and 11 the crank cheeks or crank arms thereof. The cylinders are indicated at 12, and 13 are the connecting rods for the pistons adapted to operate in said cylinders.

Mounted in the crank case, at each end of said case, is a baffle member having horizontal attaching lugs 14 secured to the flange surrounding the upper half of the crank case, and having a semi-circular flange 15 lying in a vertical plane and extending above the crank shaft but closely adjacent thereto. At its outer edge this flange carries a curved lateral plate 16 constituting a lubricant throw interrupting element and extending semi-circularly around the crank shaft in the upper half of the crank case just beyond the limit of throw of a crank cheek 11. This interrupting element of the baffle plates is preferably of at least as great a width as a crank cheek and serves to catch lubricant that may be thrown by the crank cheek in the centrifugal action thereof toward the corresponding cylinder, thus preventing the excessive feed of oil to the cylinder so as to thereby avoid carbonization and undue emission of smoke from the engine through the exhaust. The baffle plate is made of thin sheet metal and owing to this formation and to its location closely adjacent to the crank cheek and at a considerable distance below the lower end of the cylinder, ample ventilation is retained around the baffle, and no increase in velocity head of the air immediately behind the piston is created, thereby avoiding the sucking of oil into the cylinder.

Similar baffle members 17 are secured to the bridge piece 18 of the central bearing of the crank case, one on each side of said bridge piece.

Between the end baffle members and the central baffle members, are mounted in the crank case, intermediate baffle plates 19 which have their ends bent into attaching flanges 20 adapted to be secured to the walls of the crank case. The side edges of these plates may be flanged at 21 to stiffen them. Two of said baffle plates are to be employed between each end of the crank case and the central main bearing, and each of such members extends over a crank cheek and closely adjacent to the upper termination of the travel thereof and also over the ends of the connecting rod bearings, thus intercepting any oil that leaks out of these bearings.

In the operation of the engine, oil thrown by centrifugal force from the crank cheeks will be carried against the baffles and thereby prevented from entering the cylinders and will fall into the bottom of the crank case.

Having thus described my invention, what I claim and desire to secure by Letters Patent is:

1. In combination with an engine cylinder having an unrestricted open lower end, a crank shaft, a crank case and a laterally extended baffle plate mounted in the crank case and extending across the crank case to the side walls thereof and interposed between the crank shaft and the lower end of the cylinder.

2. In combination with a series of engine cylinders, a crank shaft, connecting rods carried by said shaft, and a series of laterally extended baffle plates mounted on the side walls of the crank case above and adjacent to the crank cheeks and spaced from one another and overlapping the bearings of the connecting rods.

3. In combination with an engine cylinder, a crank shaft, a crank shaft cheek, a baffle plate of semi-circular form overlapping the crank cheek and extending to the end of the cylinder and spaced from said cylinder.

4. In combination with an engine cylinder, a crank shaft, a crank case, a curved baffle plate having an attaching flange and having a laterally extended interrupting member angularly disposed to said flange and overlapping the crank cheek of said shaft between the same and the lower end of the cylinder.

5. In combination with an engine cylinder, a crank case, a crank shaft in said case and a plurality of baffle plates extending across said crank case above said shaft and overlapping the crank cheeks, each plate having its ends rigidly secured to the side walls of the crank case.

6. In combination with an engine cylinder, a crank case divided longitudinally into two sections, a crank shaft in said crank case and a baffle plate secured to the upper section of said crank case, extending across the crank case and intercepting the oil thrown upwardly by the crank shaft.

In testimony whereof I affix my signature.

JESSE G. VINCENT.